3,003,993
PROCESS FOR COLOR STABILIZING ACRYLONITRILE POLYMERS BY WASHING WITH ETHYLENE DIAMINE TETRAACETIC ACID
Willis C. Wooten, Jr., Kingsport, Tenn., assignor to Eastman Kodak Company, Rochester, N.Y., a corporation of New Jersey
No Drawing. Filed Oct. 19, 1959, Ser. No. 847,097
5 Claims. (Cl. 260—45.5)

This invention concerns the color stabilization of acrylonitrile polymers. It is also concerned with the preparation of whiter acrylonitrile fibers.

Processes for preparing homo- and co-polymers of acrylonitrile are well known. Processes for preparing graft polymers of acrylonitrile and their advantages over other types of acrylonitrile containing polymers are discussed in detail in U.S. Patents 2,620,324, 2,649,434, 2,657,191, 2,838,470, 2,879,253, 2,879,254, etc.

Most of these compositions are readily soluble in solvents such as dimethyl formamide, and any of them can be spun into fibers having excellent physical properties. However, in many instances, these compositions develop color during ordinary processing, and thereby give rise to fibers having a yellow color as opposed to white. The increase of color of the polymer solutions can be directly correlated with an increase in color of the unbleached fiber.

I have discovered that acrylonitrile polymers can be washed following polymerization with a weak solution of ethylene diamine tetraacetic acid to color stabilize these polymers.

Ethylene diamine tetraacetic acid has been disclosed for use in treating polyacrylonitrile fibers which had been spun from concentrated aqueous solutions of certain highly hydrated metal salts such as zinc chloride. Such a spinning process as taught by Rein in U.S. Patent 2,140,921 and Kropa in U.S. Patent 2,356,767, leaves a large amount of metallic salts in the fibers. This salt content may be of a value between 2 and 15%. Stanton in U.S. Patent 2,648,592 discloses a process of treating fibers spun from such spinning solutions after the final wet stretching treatment with the alkali metal salts of ethylene diamine tetraacetic acid at a pH value near 8 in order to prevent the fibers from being weak, brittle and full of voids.

I have found that a very small amount of ethylene diamine tetraacetic acid can be used in washing an acrylonitrile-containing polymer for color stabilization. This amount is less than 1000 p.p.m. (0.1%) and normally less than 100 p.p.m. (0.01%). The total amount is .001–.000001 g. ethylene diamine tetraacetic acid contacted with one gram of the acrylonitrile-containing polymer.

One object of this invention is to produce acrylonitrile-containing polymers which are color stable. A further object is to provide a process for treating (washing) a recently polymerized acrylonitrile-containing polymer with a very small amount of ethylene diamine tetraacetic acid dissolved in water. Another object of this invention is to produce a polymer containing at least 40% acrylonitrile which is readily soluble in dimethyl formamide. A further object is to produce acrylonitrile-containing polymers, solutions of which in solvents such as dimethyl formamide, will not discolor when subjected to the temperatures and conditions of ordinary processing. An additional object is to produce a white fiber having superior physical properties.

The above objects may be obtained by washing acrylonitrile polymers containing as little as 40% acrylonitrile with between 1 and 1000 p.p.m. of ethylene diamine tetraacetic acid (EDTA) in water. This agent is added to the wash water for washing the polymer following polymerization.

Acrylonitrile-containing polymers of the type referred to above are usually insoluble in water and are prepared or obtained as slurries or emulsions. These slurries or emulsions are then heated and coagulated and the polymer slurry or emulsion filtered or centrifuged to collect the polymer. In many instances the polymer slurries are obtained in such a form that they can be filtered directly to collect the polymer and in these cases the coagulation step is unnecessary. The polymer which is usually in the form of a fine powder is then washed, and dried. The dried polymer is dissolved usually with heating in an appropriate solvent, and the resultant dope is pumped, filtered, aged, and the like until it is finally spun into fibers.

Color of the resultant fiber can be predicted by measuring the degree of color in the dope, and by measuring the percentage of blue 420 light transmitted by the sample in an Lumetron colorimeter. Dope having a relatively high transmission can be spun into fibers of excellent color (i.e., essentially white). A change of between 2 and 3% in the blue transmission of a 5% dope corresponds in the resultant fiber in a color change that can be detected by the naked eye.

The following examples are presented to illustrate my invention but are not intended to limit it in any way.

EXAMPLE 1

Twenty grams of acrylonitrile, 300 grams of water and 0.2 gram of phosphoric acid were placed in a one quart bottle. The air was removed by sweeping with nitrogen, after which 0.025 gram of t-dodecyl mercapten, 0.1 gram of ammonium persulfate and 0.2 gram of sodium bisulfite were quickly added and the bottle sealed by means of a crown cap lined with polyethylene. The bottle was then tumbled end over end in a constant temperature water bath at 35° C. for 6 hours. At this time essentially all of the acrylonitrile had been polymerized. The polymer was freed from the water by filtration. In some polymerizations, but not this one, the polymer is obtained in such a finely divided state that it is difficult to collect by filtration. This is particularly true if surface active agents are added to the polymerization recipe. In such cases the reaction mixture is converted to a more filterable form by addition of salt (NaCl) and by heating.

A sample of the recently polymerized polyacrylonitrile was filtered and divided into two equal parts. The first part (designated Part A) containing 10 grams of polymer, was washed with four 100 cc. portions of water containing 20 p.p.m. of ethylene diamine tetraacetic acid based on the water. The second part (designated Part B) containing 10 g. was washed in the same manner with water containing no ethylene diamine tetraacetic acid.

Both parts were dried at 50° C. for 48 hours. The two batches of polymer were dissolved in dimethyl formamide and formed into fibers by extrusion of the solution downward into hot air. Polymer A produced fibers which were almost pure white, while polymer B produced fibers with a pronounced yellow-brown color.

EXAMPLE II

The fibers formed from polymer (B) in Example I were given the following treatments:

(A) A portion of the fiber was led through a 16% solution (pH 8) of the tetrasodium salt of ethylene diamine tetraacetic acid for one minute and then dried. This fiber was unchanged in color.

(B) A portion of the fiber was washed in four 100 cc. portions of water containing 20 p.p.m. of ethylene diamine tetraacetic acid as in Part A. There was no change in color in the fiber.

EXAMPLE III

A 20 g. sample of recently prepared polymer of 75% of acrylonitrile grafted onto 25% of a copolymer of 30% acrylonitrile and 70% N-methyl methacrylate was heated to coagulate the particles, filtered and split into two batches. The filtrate was divided into two parts and the first part, 10 g. (designated Part A) was washed five times with 100 cc. portions of water, and the second part 10 g. (designated Part B) was washed five times with 100 cc. portions of water containing 20 p.p.m. of ethylene diamine tetraacetic acid, based on the water. They were dried under identical conditions. Five grams of each sample was dissolved in 95 grams of distilled dimethyl formamide and were heated at 100° C. for 36 hours with the following results.

*Table I*

| Number | Type of washing | Percent Blue transmission of 5% dopes after heating at 100° C. for 36 hours in absence of oxygen |
|---|---|---|
| A | water | 26 |
| B | water containing 20 p.p.m. ethylene diamine tetraacetic acid. | 48.2 |

EXAMPLE IV

A 20 g. sample of a recently prepared copolymer of 50% acrylonitrile and 50% vinylidene chloride was washed five times as in Example III, with the following results:

| Number | Type of Washing | Percent Blue Transmission after Heating 5% Dope at 100° C. for 15 hrs. |
|---|---|---|
| A | Demineralized water | 14 |
| B | Demineralized water containing 20 p.p.m. ethylene diamine tetraacetic acid. | 37 |

EXAMPLE V

A sample of recently polymerized copolymer of 60% acrylonitrile and 40% styrene was washed five times as in Example III with the following results:

| Number | Type of Washing | Percent Blue Transmission after Heating 5% Dope at 100° C. for 15 hrs. |
|---|---|---|
| A | Tap water | 27 |
| B | Tap water containing 20 p.p.m. ethylene diamine tetraacetic acid. | 53 |

EXAMPLE VI

Four five gram samples of acrylonitrile polymer prepared as in Example III were washed without ethylene diamine tetraacetic acid and were dissolved in 95 grams of disilled dimethyl formamide to form a dope. An amount of ethylene diamine tetraacetic acid as indicated in the table below, was added to the respective samples. The four samples were heated at 100° C. for 15 hours. The degree of the color in the dope was determined by measuring the degree of light transmission in a Lumetron colorimeter using a blue 420 filter. The following results were obtained:

| Sample | Amount of Ethylene Diamine Tetraacetic Acid contained in the Dope, p.p.m. | Transmission, percent |
|---|---|---|
| 1 | 0 | 26.0 |
| 2 | 20 | 26.5 |
| 3 | 100 | 25.5 |
| 4 | 1,000 | 25.0 |

No improvement in polymer stability was obtained. Thus the addition of the EDTA to the polymer does not improve the stability. The polymer must be washed with an ethylene diamine tetraacetic acid solution before the solutions are prepared to obtain a stable polymer.

Polymeric compositions, which are to be spun from spinning solutions in which the polymer is dissolved in a solvent such as dimethyl formamide, in many instances result in fibers which have a yellow cast. Treatment of the polymers following the spinning process with a small amount, as low as 0.1%, of ethylene diamine tetraacetic acid does not result in stabilizing these polymers or in improving their color. However, the method of treating acrylonitrile-containing polymers with a solution of ethylene diamine tetraacetic acid results in fibers being formed which have improved color stability. The method of improving acrylonitrile-containing polymer is easily performed and relatively inexpensive.

Polymers containing 40 to 100% of acryonitrile together with up to 60% of other unsaturated compounds may also be treated advantageously by the process of my invention. Such polymers include interpolymers, graft polymers, and monoethylenically unsaturated polymerizable compounds.

Mixtures of an acrylonitrile-containing polymer with other polymers may be washed as disclosed herein, and it is understood that washing such mixtures is within the scope of our invention.

Representative compounds are methyl acrylate, butyl acrylate, methyl methacrylate, acrylamide, N-methylacrylamide, N-ethylacrylamide, N-isopropylacrylamide, N-t-butylacrylamide, N,N-dimethylacrylamide, N,N-diethylacrylamide, methacrylamide, N-methylmethacrylamide, N - ethylmethacrylamide, N - isopropylmethacrylamide, N,N-dimethylmethacrylamide, vinyl acetate, vinyl propionate, vinyl butyrate, vinyl isobutyrate, styrene, α-methylstyrene, p-acetaminostyrene, α-acetoxystyrene, vinyl chloride, vinylidene chloride, ethyl vinyl ether, isopropyl vinyl ether, isopropyenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, 2-vinyl pyridine, 5-vinyl pyridine, 2-methyl-5-vinyl pyridine, methacrylic acid, fumaronitrile, methacrylonitrile, N-vinylphthalimide, and ethylene. Especially useful polymerizable compounds coming within the scope of the above formula contain a $CH_2=C<$ group.

With regard to the Lumetron colorimeter, the "420 light" refers to the peak wavelength in millimicrons (420 millimicrons, 4200 Angstrom units) of the light that passes through the regular Lumetron colorimeter blue filter.

This application is a continuation-in-part of U.S. patent application Serial No. 562,651, filed February 1, 1956, now abandoned.

I claim:

1. A process for color stabilizing an acrylonitrile polymer selected from the class consisting of a homopolymer of acrylonitrile and a copolymer of at least 40% acrylonitrile and up to 60% of a monoethylenically unsaturated compound which comprises washing the recently polymerized finely-divided polymer sufficiently to color stabilize the polymer with wash water containing 1–1,000 parts per million of ethylene diamine tetraacetic acid so that .001–.000001 g. of acid is contacted with one gram of polymer.

2. A process for color stabilizing a copolymer of 40% acrylonitrile and 60% vinylidene chloride comprising washing the recently polymerized finely-divided copolymer sufficiently to color stabilize the polymer with wash water containing 1–1,000 parts per million of ethylene diamine tetraacetic acid, so that .001–.000001 g. of acid is contacted with one gram of polymer.

3. A process for color stabilizing a copolymer of 60% acrylonitrile and 40% styrene comprising washing the recently polymerized finely-divided copolymer sufficiently to color stabilize the polymer with wash water containing 1–1,000 parts per million of ethylene diamine tetraacetic acid so that .001–.000001 g. of acid is contacted with one gram of polymer.

4. A process for color stabilizing a graft copolymer of at least 40% acrylonitrile and up to 60% of a copolymer of acrylonitrile and N-methacrylamide comprising washing the finely-divided graft copolymer sufficiently to color stabilize the polymer with wash water containing 1–1,000 parts per million of ethylene diamine tetraacetic acid following the graft polymerization so that .001–.000001 g. of acid is contacted with one gram of polymer.

5. A process for color stabilizing a copolymer of 50% acrylonitrile and 50% vinylidene chloride comprising washing the recently polymerized finely divided copolymer sufficiently to color stabilize the polymer with wash water containing 1–1,000 parts per million of ethylene diamine tetraacetic acid, so that .001–.000001 g. of acid is contacted with one gram of polymer.

References Cited in the file of this patent

UNITED STATES PATENTS

| | | |
|---|---|---|
| 2,436,926 | Jacobson | Mar. 2, 1948 |
| 2,558,728 | Britton et al. | July 3, 1951 |
| 2,560,744 | Rhines | July 17, 1951 |
| 2,648,592 | Stanton | Aug. 11, 1953 |
| 2,648,593 | Stanton | Aug. 11, 1953 |
| 2,667,522 | McElroy | Jan. 26, 1954 |

OTHER REFERENCES

Martell et al.—Properties and uses of ethylenediamine tetra acetic acid and its salts, page 7, Beersworth Chemical Company, Framingham, Mass. (1948).